(12) United States Patent
Kawakami et al.

(10) Patent No.: US 7,406,081 B2
(45) Date of Patent: Jul. 29, 2008

(54) NETWORK DEVICE FOR REMOTE SETTING OPERATIONS

(75) Inventors: Naoko Kawakami, Kawasaki (JP); Toshihide Hara, Kawasaki (JP); Motohiro Uchiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 667 days.

(21) Appl. No.: 10/991,229

(22) Filed: Nov. 17, 2004

(65) Prior Publication Data

US 2006/0034272 A1    Feb. 16, 2006

(30) Foreign Application Priority Data

Jul. 20, 2004    (JP)    ............................. 2004-211984

(51) Int. Cl.
H04L 12/56    (2006.01)
G06F 15/177    (2006.01)

(52) U.S. Cl. ...................................... 370/392; 370/401
(58) Field of Classification Search ................. 370/410
See application file for complete search history.

(56) References Cited

U.S. PATENT DOCUMENTS

| | | | |
|---|---|---|---|
| 5,751,967 A * | 5/1998 | Raab et al. ................... 709/228 |
| 6,085,238 A * | 7/2000 | Yuasa et al. .................. 709/223 |
| 6,223,218 B1 * | 4/2001 | Iijima et al. ................. 709/221 |
| 6,725,264 B1 * | 4/2004 | Christy ....................... 709/225 |
| 6,748,439 B1 * | 6/2004 | Monachello et al. ........ 709/229 |
| 6,834,310 B2 * | 12/2004 | Munger et al. .............. 709/232 |
| 6,856,591 B1 * | 2/2005 | Ma et al. ..................... 370/216 |
| 6,993,595 B1 * | 1/2006 | Luptowski et al. .......... 709/245 |
| 7,080,151 B1 * | 7/2006 | Borella et al. ............... 709/230 |
| 7,093,030 B1 * | 8/2006 | Henry et al. ................ 709/250 |
| 7,114,006 B2 * | 9/2006 | Colvig et al. ............... 709/245 |
| 7,216,161 B1 * | 5/2007 | Peckham et al. ............ 709/224 |
| 7,281,059 B2 * | 10/2007 | Ryu et al. .................... 709/245 |
| 2002/0023150 A1 * | 2/2002 | Osafune et al. ............. 709/221 |
| 2003/0120759 A1 * | 6/2003 | Ogawa ........................ 709/221 |
| 2003/0142642 A1 * | 7/2003 | Agrawal et al. ............. 370/328 |
| 2004/0032837 A1 * | 2/2004 | Visser ......................... 370/254 |
| 2004/0139179 A1 * | 7/2004 | Beyda ......................... 709/221 |
| 2005/0013280 A1 * | 1/2005 | Buddhikot et al. .......... 370/349 |
| 2005/0047579 A1 * | 3/2005 | Salame .................. 379/265.09 |

(Continued)

FOREIGN PATENT DOCUMENTS

JP    10-200584    7/1998

(Continued)

OTHER PUBLICATIONS

Notification of Reason for Refusal, dated Nov. 20, 2007, from the corresponding Japanese Application No. 2004-211984.

Primary Examiner—Chau T. Nguyen
Assistant Examiner—Timothy J Weidner
(74) Attorney, Agent, or Firm—Katten Muchin Rosenman LLP

(57) ABSTRACT

In a network device for setting a configuration definition remotely, a storage generates, upon changing a first (current) IP address to a second IP address, a virtual address which holds the second IP address, a message transceiver transmits a response request message whose source IP address is the second IP address, and a configuration definition setting portion changes the first IP address to the second IP address when the response message for the request is received.

16 Claims, 10 Drawing Sheets

U.S. PATENT DOCUMENTS

2005/0111455 A1 * 5/2005 Nozue et al. ................ 370/392

FOREIGN PATENT DOCUMENTS

| JP | 11-098170 | 4/1999 |
| JP | 11-098171 | 4/1999 |
| JP | 11-234283 | 8/1999 |
| JP | 2001-251337 | 9/2001 |
| JP | 2002-171255 | 6/2002 |
| JP | 2002-204251 | 7/2002 |
| JP | 2003-338819 | 11/2003 |

* cited by examiner

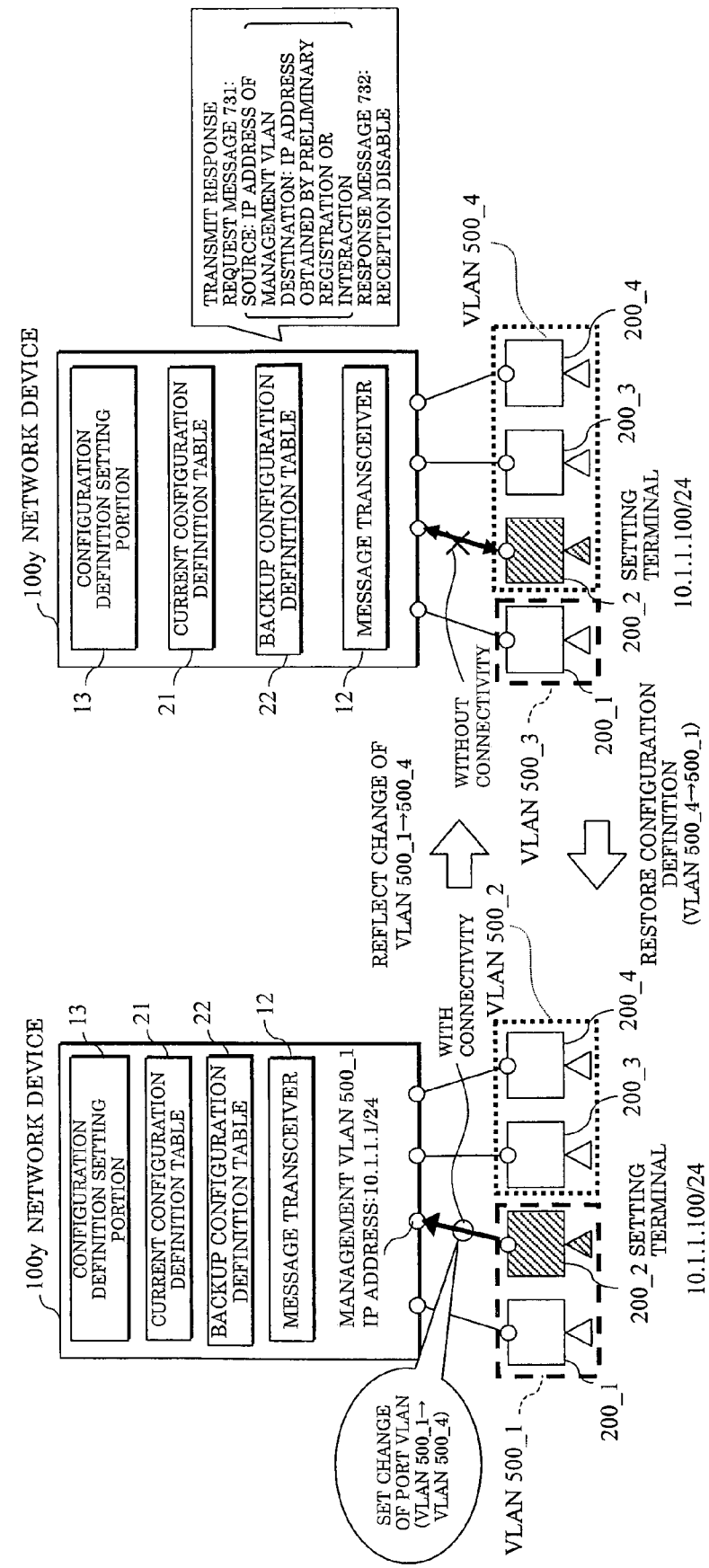

FIG.3

| PRINCIPLE | SOURCE ADDRESS (ITS OWN ENVIRONMENT) OF RESPONSE REQUEST MESSAGE 731 FROM NETWORK DEVICE TO TERMINAL | VLAN ENVIRONMENT (ENVIRONMENT OF SETTING (SETTER) TERMINAL) FROM NETWORK DEVICE TO DESTINATION TERMINAL OF RESPONSE REQUEST MESSAGE 731 |
|---|---|---|
| FIGS.1A & 1B | CHANGE TO ADDRESS AFTER CHANGE IS REQUIRED (= SIMULATION BY USING VIRTUAL ADDRESS) | UNCHANGED (=AFTER REFLECTING SETTING, NO COMMUNICATION CONFIRMATION IS REQUIRED) ※ALTHOUGH COMMUNICATION CONFIRMATION CAN BE PERFORMED AFTER REFLECTING SETTING, VIRTUAL ADDRESS IS USED FOR PURPOSE OF MAINTAINING UTMOST CONNECTIVITY |
| FIGS.2A & 2B | NO CHANGE IS REQUIRED (= VIRTUAL ADDRESS IS UNUSED) | CHANGE DUE TO SETTING CHANGE (= COMMUNICATION CONFIRMATION IS REQUIRED AFTER REFLECTING SETTING) |

FIG.6A  ICMP PACKET 700
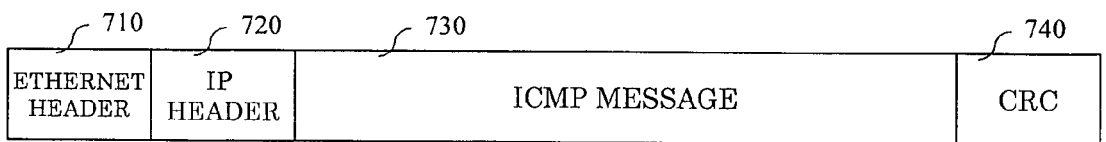
FIG.6B  ECHO REQUEST MESSAGE 731
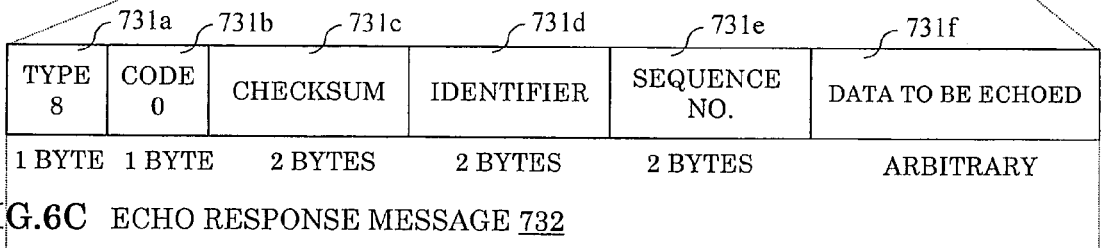
FIG.6C  ECHO RESPONSE MESSAGE 732
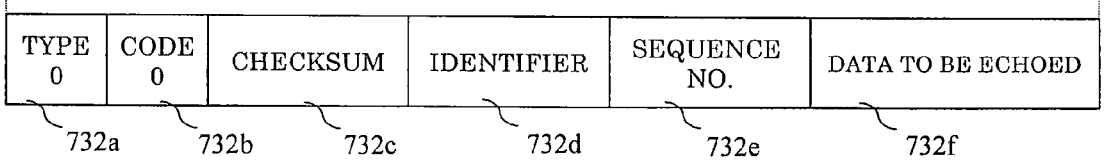

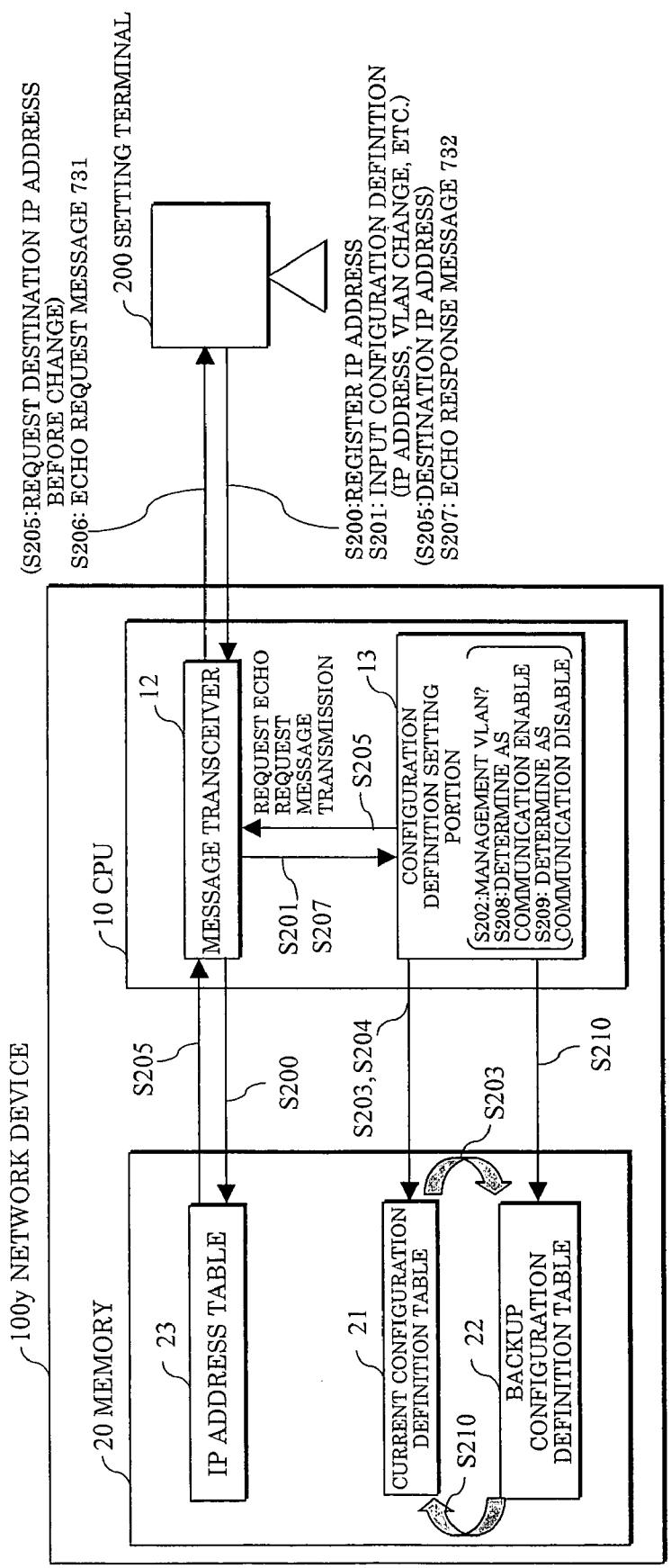

NETWORK DEVICE FOR REMOTE SETTING OPERATIONS

BACKGROUND OF THE INVENTION

1. Field of the Invention

The present invention relates to a network device, and in particular to a network device in which setting a configuration definition is remotely performed.

Together with a recent highly developed communication technology, a network device configuring a network has been provided with various functions supporting a VLAN network or the like, and has become more and more complicated and sophisticated. In many cases, a setting operation for making the network device support a predetermined VLAN network, namely a setting operation of a configuration definition is remotely performed from a terminal. In such a setting operation, it is important to hold a connection of a setting operation path between the network device and the terminal.

2. Description of the Related Art

As an example of a prior art network device, a router can be mentioned for connecting a LAN structured in a small office/home office (SOHO) or the like to an IP network. This router is provided with an operational key and an indicator, and by using these operational key and indicator, sets communication conditions, starts up communication confirmation, makes reference to fault information and the like (see e.g. patent documents 1 and 2).

However, since numerous relevant network devices generally exist, the setting of the network device is not performed on the site of each network device, but is remotely performed from the terminal through a setting operation path. For setting the network device in the IP network, for example, a remote setting operation by using a Telnet connection is general.

For this remote setting operation, a connectivity at an IP level is required between the network device and a setting terminal. In the absence of the connectivity, the network device becomes inaccessible from the setting terminal.

[Patent document 1] Japanese Patent Application Laid-open No. 11-98170 (page 2, FIG. 3)

[Patent document 2] Japanese Patent Application Laid-open No. 11-98171 (page 2, FIG. 3)

A reachability being lost at the IP level between the network device and the terminal during the remote setting operation from the setting terminal is caused by the following error settings (1) and (2):

(1) Error setting of an IP address as a configuration definition (IP address of management VLAN in case of L2 device);
(2) Error setting of a VLAN of a port to which a setting terminal belonging to a management VLAN is connected as a configuration definition (VLAN environment of L2 device).

When the error setting (1) or (2) occurs, the remote setting operation from the terminal is disabled, so that a setting operation by a console connection becomes necessary at a site where the network device is installed.

SUMMARY OF THE INVENTION

It is accordingly an object of the present invention to provide a network device in which setting a configuration definition is remotely performed, wherein a connectivity between its own device and a setting terminal is secured.

Principle (1)

In order to achieve the above-mentioned object, a network device according to the present invention comprises: a storage storing, upon changing a first IP address to a second IP address, the second IP address as a virtual address; a message transceiver transmitting a response request message whose source IP address is the second IP address, and receiving a response message for the request; and a configuration definition setting portion changing the first IP address to the second IP address when the message transceiver receives the response message.

FIGS. 1A and 1B show a principle (1) of the network device according to the present invention. A network device 100x is provided with a storage 11, a message transceiver 12, and a configuration definition setting portion 13. In FIG. 1A, when e.g. a terminal (remote setting operation device) 200_2 requests the network device 100x to change a present IP address (first IP address) to another IP address (second IP address), the IP address after the change (second IP address) is stored in the storage 11 as a virtual address 14. In FIG. 1B, the message transceiver 12 transmits a response request message 731 (source IP address=virtual address 14, destination IP address=IP address of terminal 200_2) and receives a response message 732 for the second IP address 731.

The configuration definition setting portion 13 changes the first IP address to the second IP address when the message transceiver 12 receives the response message 732.

Thus, by using the virtual address 14 which is the (second) IP address after the change, an IP network environment is simulated. In the presence of a problem, it becomes possible to disable the IP address change request, thereby avoiding a disconnection state between the network device 100x and setting terminal 200_2 due to error setting of the IP address. Namely, in the state where the connectivity between the network device 100x and the setting terminal 200_2 is held (connection holding function), the error setting is confirmed.

Also, the present invention may further comprise an IP address table storing a destination IP address of the response request message, and the response request message may be transmitted only to the destination IP address registered in the table. Namely, it is possible to store an IP address of a device at the other end (e.g. remote setting operation device itself) which confirms the connectivity in an IP address table.

Also, in the present invention, the IP address may belong to a management VLAN. Namely, in FIG. 1A, the IP address="10.1.1.1/24" may belong to a management VLAN 500_1.

Also, in the present invention, a remote setting operation device may designate the destination IP address of the response request message. Namely, the remote setting operation device (setting terminal) may designate the IP address of the device at the other end (e.g. remote setting operation device itself) which confirms the connectivity, which is the destination of the response request message.

Also, in the present invention, ICMP messages may be used as the response request message and the response message. Namely, it is possible to confirm the connection between the remote setting operation device and the network device by using e.g. ICMP (Internet Control Message Protocol) message as the response request message and the response message.

Also, in the present invention, a remote setting operation device may designate the second IP address. Namely, the (second) IP address after the change of the first IP address can be designated by the remote setting operation device (setting terminal).

Furthermore, the present invention may further comprise a timer started up upon transmitting the response request message, and the configuration definition setting portion may keep the first IP address from changing to the second IP address when no connection request is received from the remote setting operation device before a time set in the timer elapses.

Principle (2)

Also, in order to achieve the above-mentioned object, a network device according to the present invention comprises: a backup configuration definition table temporarily storing a first configuration definition when a change from the first configuration definition to a second configuration definition includes a change of a VLAN definition of a port belonging to a management VLAN; a message transceiver transmitting a response request message through a port of which VLAN definition has been changed, and receiving a response message for the message; and a configuration definition setting portion changing the first configuration definition to the second configuration definition, and then returning, when the message transceiver receives no response message, the second configuration definition to the first configuration definition temporarily stored in the backup configuration definition table.

FIGS. 2A and 2B show a principle (2) of the network device according to the present invention. A network device 100y is provided with a backup configuration definition table 22, the message transceiver 12, and the configuration definition setting portion 13.

It is supposed that the first (current) configuration definition (definition of VLAN to which a port belongs, IP address, or the like) during the operation of the network device 100y is developed (set) in e.g. a current configuration definition table 21 (see FIGS. 2A and 2B).

When being requested to change the first configuration definition (current configuration definition) to the second configuration definition (configuration definition after change), the configuration definition setting portion 13 stores the current configuration definition of the current configuration definition table 21 in the backup configuration definition table 22, and then develops the second configuration definition in the current configuration definition table. In the change of the configuration definition, the change of the VLAN to which the port belongs is also included.

The message transceiver 12 transmits the response request message 731 (destination=setting terminal) through the port which belongs, to a changed VLAN. When the response message that is a response for the message 731 is not received, the message transceiver 12 notifies the absence of the response message reception to the configuration definition setting portion 13. When receiving this notification, the configuration definition setting portion 13 returns the first configuration definition temporarily stored in the backup configuration definition table to the current configuration definition table 21.

Thus, the connectivity between the network device 100y and e.g. the setting terminal 200_2 due to the change of the VLAN to which the port belongs is detected. In the absence of the connectivity, it is possible to return (restore) the configuration definition before change (configuration definition restoring function).

FIG. 3 shows a difference between the above-mentioned principles (1) and (2). The commonality between the principles (1) and (2) is that the response request message 731 is transmitted. Whether or not the change of the configuration definition (IP address or management VLAN to which port belongs) is normally performed is determined according to whether or not the response message is received. Based on the determination result, the configuration definition is changed.

The difference between the principles (1) and (2) is as follows: It is assumed in the principle (1) that the VLAN environment of its own network device with respect to the terminal of the destination of the response request message 731 is not changed. Since the virtual address that is the (second) IP address after the change is used in the simulation when the IP address is changed, the source IP address of the response request message 731 is required to be changed to the second IP address.

The advantage of using this virtual address is that the connectivity between its own network device and the terminal is maintained.

On the other hand, in the principle (2), the VLAN to which the port belongs is changed. A communication test is performed by setting the VLAN to which the port belongs after the change. Accordingly, there is not such an advantage that the connectivity is maintained when the virtual address is used.

Also, the present invention may further comprise an IP address table storing a destination IP address of the response request message. Namely, it is possible to store in an address table or in list form the IP address of the device at the other end (e.g. remote setting operation device) which confirms the connectivity.

Also, in the present invention, the port may belong to the management VLAN.

Also, in the present invention, a remote setting operation device may designate the destination IP address of the response request message. Namely, the remote setting operation device (setting terminal) may designate the IP address of the device at the other end (e.g. remote setting operation device itself) which confirms the connectivity, which is the destination of the response request message.

Also, in the present invention, ICMP messages may be used as the response request message and the response message. Namely, it is possible to confirm the connection between the remote setting operation device and the network device by using ICMP messages as the response request message and the response message.

Also, in the present invention, a remote setting operation device may designate the second configuration definition. Namely, it is possible for the remote setting operation device (setting terminal) to designate the (second) configuration definition after the change of the first configuration definition.

Also, in the present invention, the first and the second configuration definitions may include an IP address.

Furthermore, the present invention may further comprise a timer started up by a transmission of the response request message, and the configuration definition setting portion may return the first configuration definition temporarily stored in the backup configuration definition table to a current configuration definition table when no connection request is received from a remote setting operation device before a time preset in the timer elapses.

Principle (3)

Furthermore, in order to achieve the above-mentioned object, a network device according to the present invention comprises: a backup configuration definition table temporarily storing, upon changing a first configuration definition to a second configuration definition, the first configuration definition; a timer clocking a lapse time preset; and a configuration definition setting portion returning the first configuration definition temporarily stored in the backup configuration definition table to a current configuration definition when the timer operation is started after the first configuration definition is changed to the second configuration definition, and when no connection request from a device preliminarily designated has been received before the lapse time.

Namely, the network device is provided with the backup configuration definition table, the timer, and the configuration definition setting portion. The configuration definition setting portion temporarily stores the current (first) configuration definition in the backup configuration definition table when the change of the current (first) configuration definition (e.g. IP address of VLAN or IP address of interface) of its own device to another (second) configuration definition is requested. Then, the configuration definition setting portion sets the (second) configuration definition to which the change is requested as the current configuration definition, and starts the timer. When receiving no connection request from the device preliminarily designated within a lapse time preliminarily designated, the configuration definition setting portion returns the first configuration definition temporarily stored in the backup configuration definition table to the current configuration definition.

Thus, it becomes possible to return (restore) the previous configuration definition from the changed configuration definition in which the connectivity between the network device and the preliminarily designated device is lost by the timer (configuration definition restoring function by timer).

Also, in the present invention, the configuration definition may comprise an IP address or a management VLAN.

Also, in the present invention, a remote setting operation device may designate the second configuration definition.

Furthermore, the network device of the present invention may be applied to an L2 network device or an L3 network device.

As described above, according to the network device of the present invention, the followings (1) and (2) can be realized: (1) The configuration definition is restored upon detecting error setting, whereby an on-site operation becomes unnecessary, and a management cost (personal and temporal costs) is reduced; (2) An automatic setting restoring function is provided in an automatic provisioning environment by an external manager, whereby the provision of a consistent autonomous system architecture through a system is realized.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 2A and 2B are block diagrams showing a principle (2) of a network device according to the present invention;

FIG. 3 is a diagram showing a difference between principles (1) and (2) of a network device according to the present invention;

FIGS. 6A-6C are diagrams showing formats of a general ICMP packet;

FIG. 7 is a block diagram showing an embodiment (2) of a network device according to the present invention;

DESCRIPTION OF THE EMBODIMENTS

Embodiment (1)

Figure 1A:
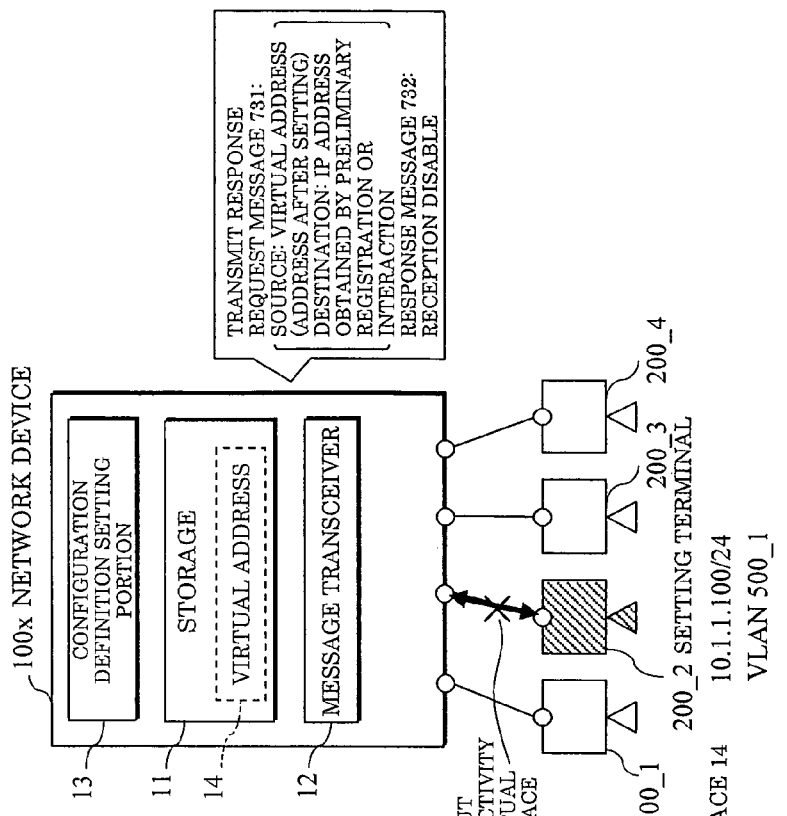
FIGS. 1A and 1B are block diagrams showing a principle (1) of a network device according to the present invention.
Figure 1B:
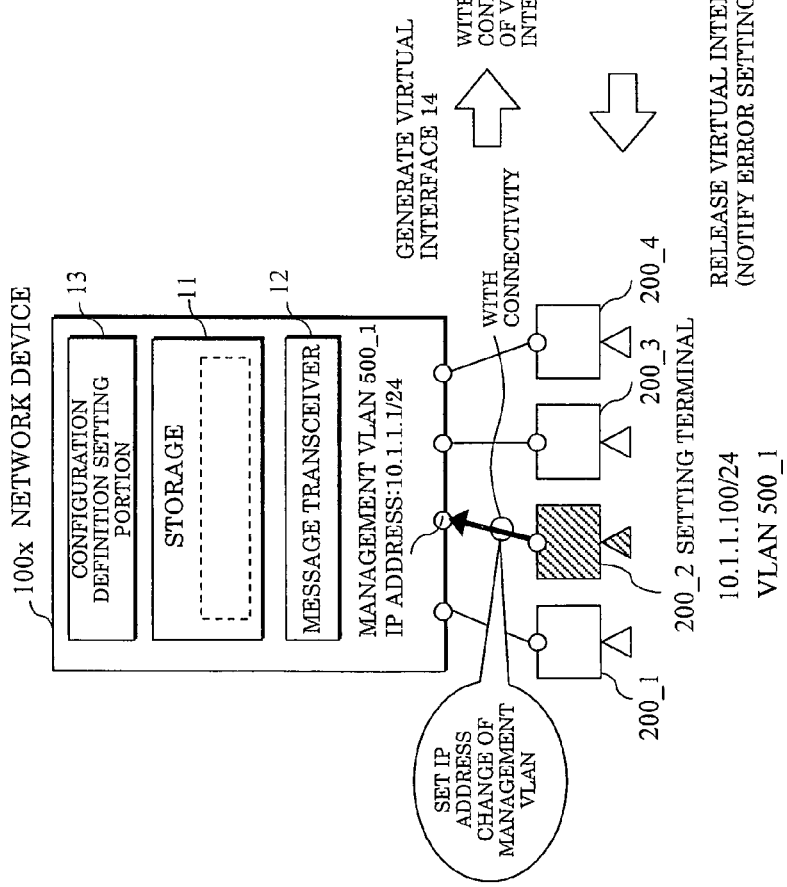
Figure 4:
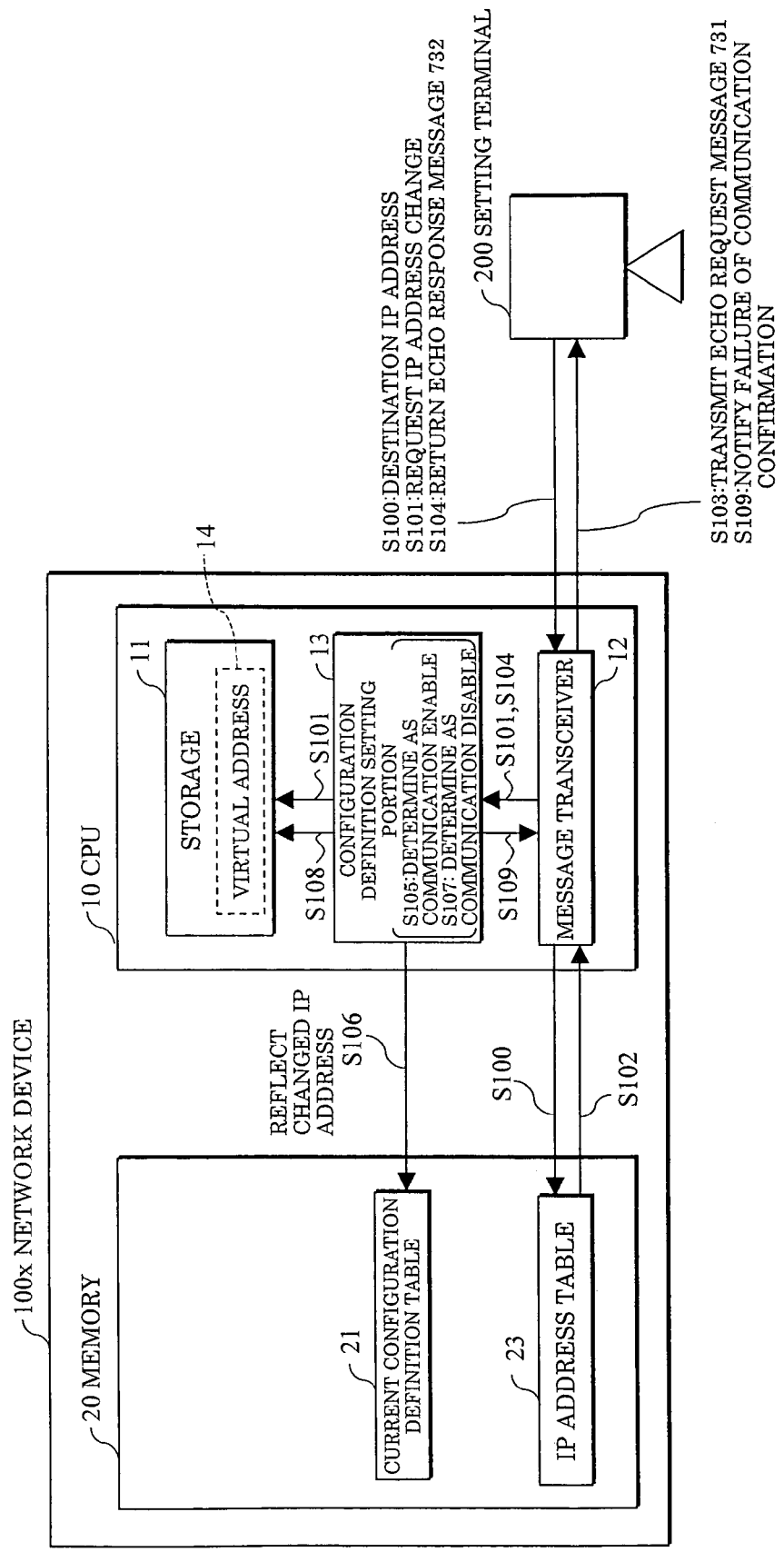
FIG. 4 is a block diagram showing an embodiment (1) of a network device according to the present invention.

FIG. 4 shows an embodiment (1) of the network device 100$x$ according to the present invention. This network device 100$x$ is provided with a CPU10 and a memory 20. A function portion included in the CPU10 has the storage 11, the message transceiver 12, the configuration definition setting portion 13, and the virtual address 14 held by the storage 11. In the memory 20, the current configuration definition table 21 and an IP address table 23 are set. To the message transceiver 12, a setting terminal 200 is connected.

In the current configuration definition table 21, the (current) configuration definition during operation of the network device such as an L2 device is developed. Also, in the IP address table 23, an IP address of a setting supposition terminal (e.g. terminal 200 supposed to be a setting terminal) is preliminarily stored before a setting change operation.

In the embodiment (1), before the setting change (change of the IP address) requested by a setter is applied to the network device 100$x$, an IP network environment after the change is preliminarily simulated by using the virtual address 14. In the absence of a problem, setting change contents are applied to the network device 100$x$. In the presence of a problem, the setting change request is invalidated, which is notified to the setter.

Namely, when IP address information inputted by the setter is error setting, the IP connectivity between the setting terminal 200 and the network device 100$x$ is interrupted, so that the access to the network device 100$x$ becomes disabled at that time. In order to avoid the interruption of the IP connectivity, a communication confirmation is performed by an ICMP echo (as for packet format, see FIGS. 6A-6C described later) using the virtual address. Only in the absence of a problem, an IP address of an actual interface (management VLAN in the L2 device) is changed.

Figure 5:
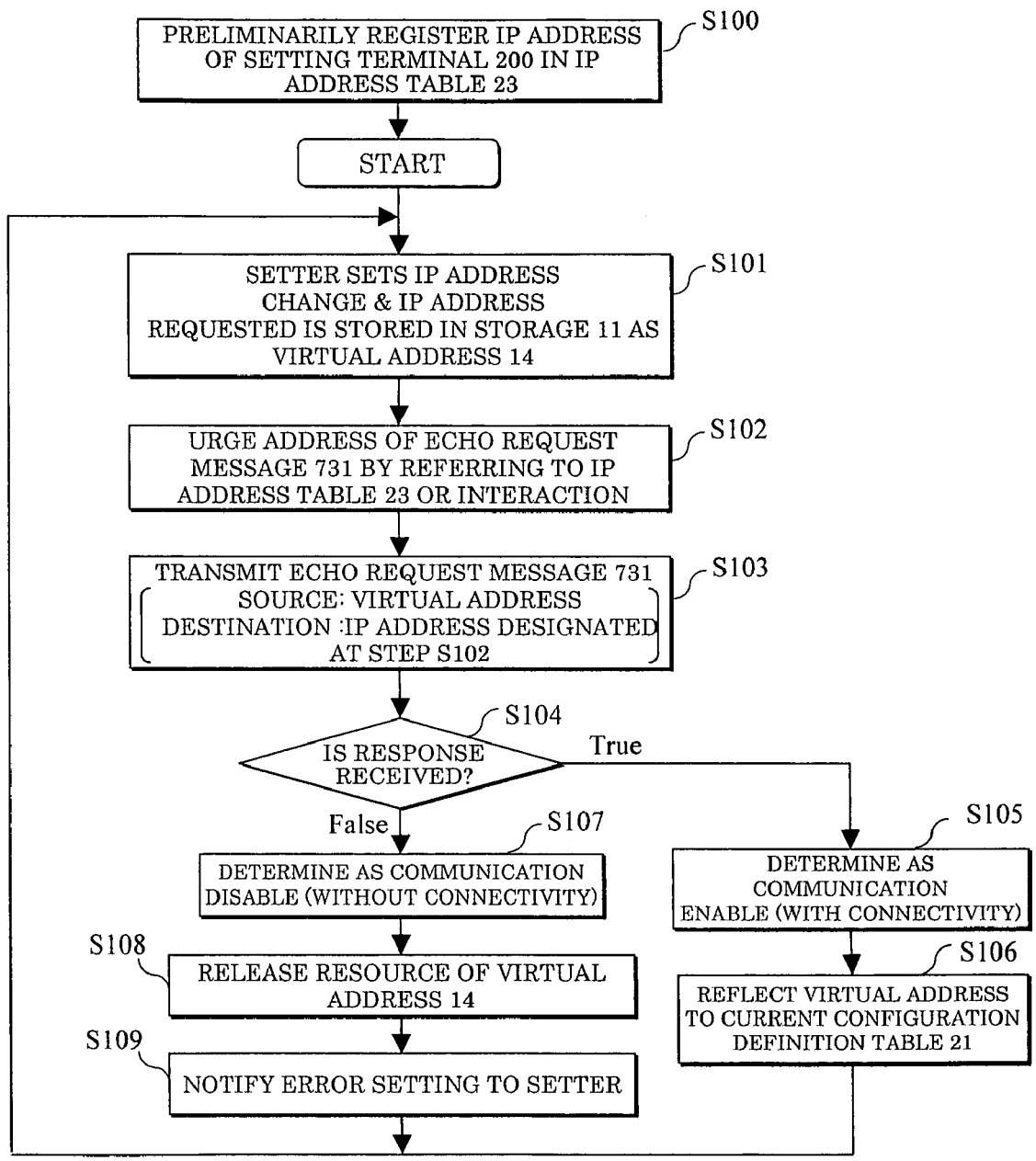
FIG. 5 is a flowchart showing an operation procedure of an embodiment (1) of a network device according to the present invention.

FIG. 5 shows an operation procedure example of the network device 100$x$, which will now be described referring to FIG. 4.

Step S100: The IP address of the terminal 200 is preliminarily registered in the IP address table 23. It is to be noted that as for the registration of the destination IP address, a setter may input it by an interaction from the terminal 200. Also, as an IP address to be registered, an IP address of a setting supposition terminal which performs a configuration setting of the network device 100$x$, different from the terminal 200 may be inputted.

Step S101: The setter requests the configuration definition setting portion 13 of the network device 100$x$ to change the IP address of the network device 100$x$ (through the message transceiver) from the terminal 200. The configuration definition setting portion 13 notifies that the IP address change is requested to the storage 11, and stores the IP address requested to the storage 11 as the virtual address 14.

Step S102: The message transceiver 12 acquires the destination IP address (IP address of the terminal 200 in this example) by referring to the IP address table 23. Alternatively, the message transceiver 12 inputs the destination IP address from the terminal 200 by interaction (not shown).

Step S103: The message transceiver 12 transmits the response request message 731 of an ICMP protocol in which the source="virtual address 14", and the destination="above-mentioned destination IP address".

Steps S104-S106: When the message transceiver 12 receives the response message 732 that is the response to the message 731, the configuration definition setting portion 13 determines as "communication enable" (with connectivity), so that the IP address of the virtual address 14 is reflected to the current configuration definition table 21.

FIG. 6A shows a format of a general ICMP (ping command) packet 700. The packet 700 is composed of an Ethernet header 710, an IP header 720, an ICMP message 730, and a CRC 740 as shown in FIG. 6A.

FIG. 6B shows an echo request message 731, in which the ICMP message 730 shown in FIG. 6A is composed of a type 731a (="8"), a code 731b, a checksum 731c, an identifier 731d, a sequence No. 731e, and data 731f to be echoed.

FIG. 6C shows an echo response message 732, in which the ICMP message 730 of FIG. 6A is composed of a type 732a (="0"), a code 732b, a checksum 732c, an identifier 732d, a sequence No. 732e, and data 732f to be echoed.

Steps S104, S107, and S108: In FIG. 5, when the message receiver 12 receives no response message 732, the configuration definition setting portion 13 determines as "communication disable" (without connectivity), does not change the current configuration definition, and instructs the storage 11 to release a resource of the virtual address 14.

Step S109: Furthermore, the configuration definition setting portion 13 notifies the setter through the message transceiver 12 that the IP address is set in error and the communication confirmation has failed.

Thus, it becomes possible to prevent the error setting, and to hold the connectivity between the setting terminal 200 and the network device.

It is to be noted that the operation of the embodiment (1) can be performed even if an L3 device intervenes between the network device 100x and the terminal 200.

Embodiment (2)

FIG. 7 shows an embodiment (2) of the network device 100y according to the present invention. This network device 100y is different from the network device 100x shown in the embodiment (1) in that the function portion included in the CPU10 has no storage 11, namely has no virtual address 14 and that the backup configuration definition table 22 is added to the memory 20. In the backup configuration definition table 22, the configuration definition (current configuration definition) has been operated before the setting change is stored as "backup configuration definition" upon setting change operation.

The current configuration definition table 21 and the IP address table 23 are the same as those in the embodiment (1).

In the embodiment (2), when the change (configuration definition change) of the VLAN setting of an arbitrary port which belongs to the management VLAN is requested, the requested change is performed. When the connectivity between the setting terminal and the network device is lost as a result of the change, the configuration definition is returned to the original configuration definition.

Figure 8:
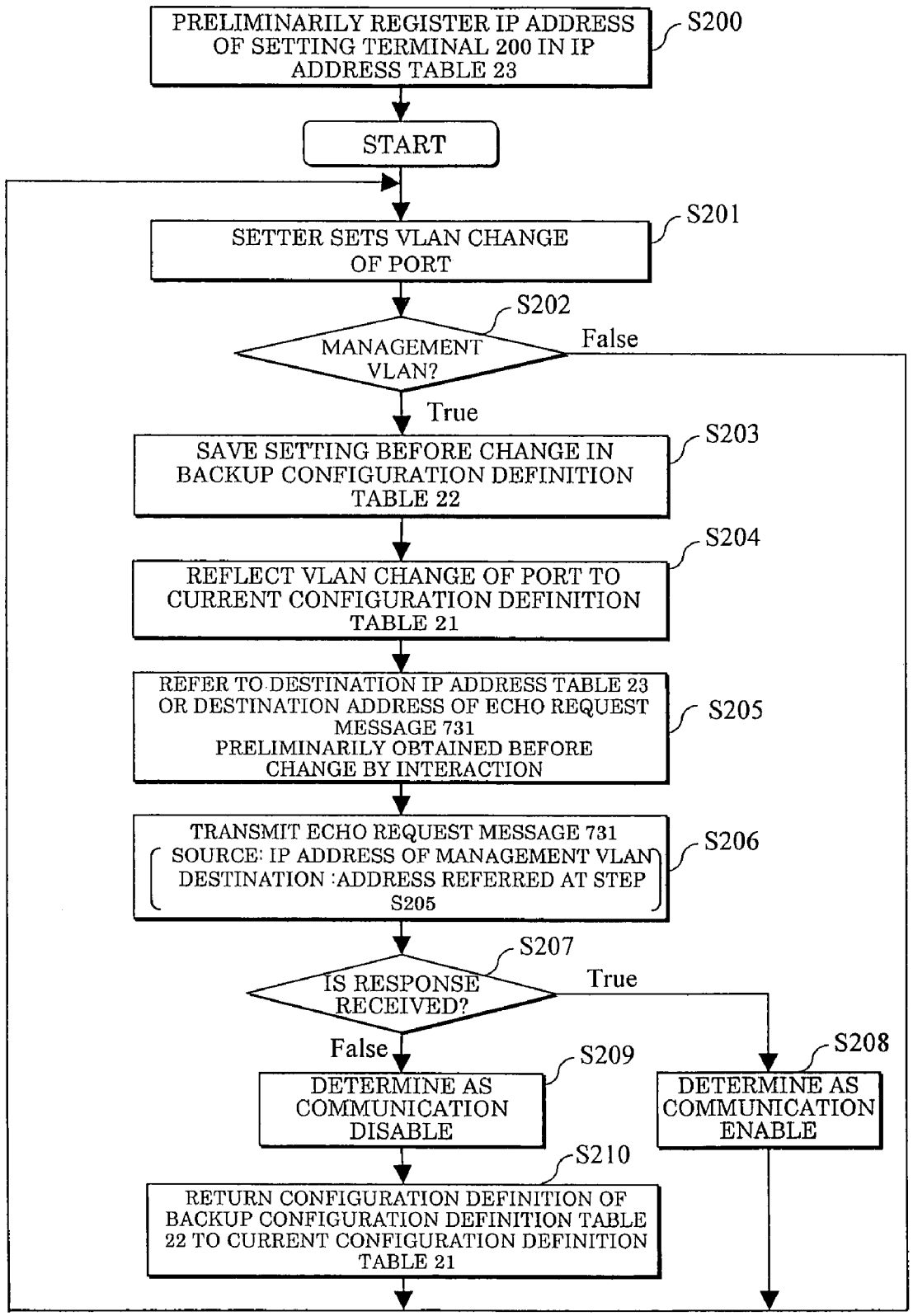
FIG. 8 is a flowchart showing an operation procedure of an embodiment (2) of a network device according to the present invention.

FIG. 8 shows an operation procedure example of the network device 100y, which will now be described by referring to FIG. 7.

Step S200: The IP address of the setting terminal 200 is preliminarily registered in the destination IP address table 23.

It is to be noted that this destination IP address may be inputted by the interaction with the terminal 200.

Step S201: A setter requests the network device 100y to change the VLAN of the port from the setting terminal 200.

Step S202: The configuration definition setting portion 13 determines whether or not the requested configuration definition change of the VLAN or the like of the port includes the management VLAN. When the management VLAN is not included, the process is ended. When it is included, the process proceeds to step S203.

Step S203: The configuration definition setting portion 13 saves the current configuration definition developed in the current configuration definition table 21 to the backup configuration definition table 22.

Step S204: The configuration definition setting portion 13 reflects (develops) the requested VLAN change or the like of the port to the current configuration definition table 21 to change the requested configuration definition of the VLAN or the like of the port.

Steps S205 and S206: The configuration definition setting portion 13 requests the message transceiver 12 to transmit the response request message 731. The message transceiver 12 transmits the response request message 731 to perform the communication confirmation. The destination of the response request message 731 is the IP address preliminarily registered or acquired by the interaction with the terminal 200 before the configuration definition change, and the source address is the address of the device interface or the IP address of the management VLAN.

Steps S207 and S208: When the message transceiver 12 receives the response message 732, the configuration definition setting portion 13 determines as "communication enable" (with connectivity) to end the process. Thus, the operation of the configuration definition after the change developed in the current configuration definition table 21 is continued.

Steps S207-S210: When the message transceiver 12 does not receive the response message 732, the configuration definition setting portion 13 determines as "communication disable" (without connectivity), and returns the contents of the backup configuration definition table 22 to the current configuration definition table 21.

Thus, the configuration definition of the network device 100y is returned to the "current configuration definition" before the change, and restores the connectivity between the network device 100y and the setting terminal 200. Namely, it becomes possible to eliminate the error setting of the management VLAN of the port, and to hold the connectivity between the network device 100y and the setting terminal 200. It is to be noted that in the embodiment (2), an IP connectivity is temporarily interrupted upon occurrence of the error setting, different from the embodiment (1).

Embodiment (3)

Figure 9:
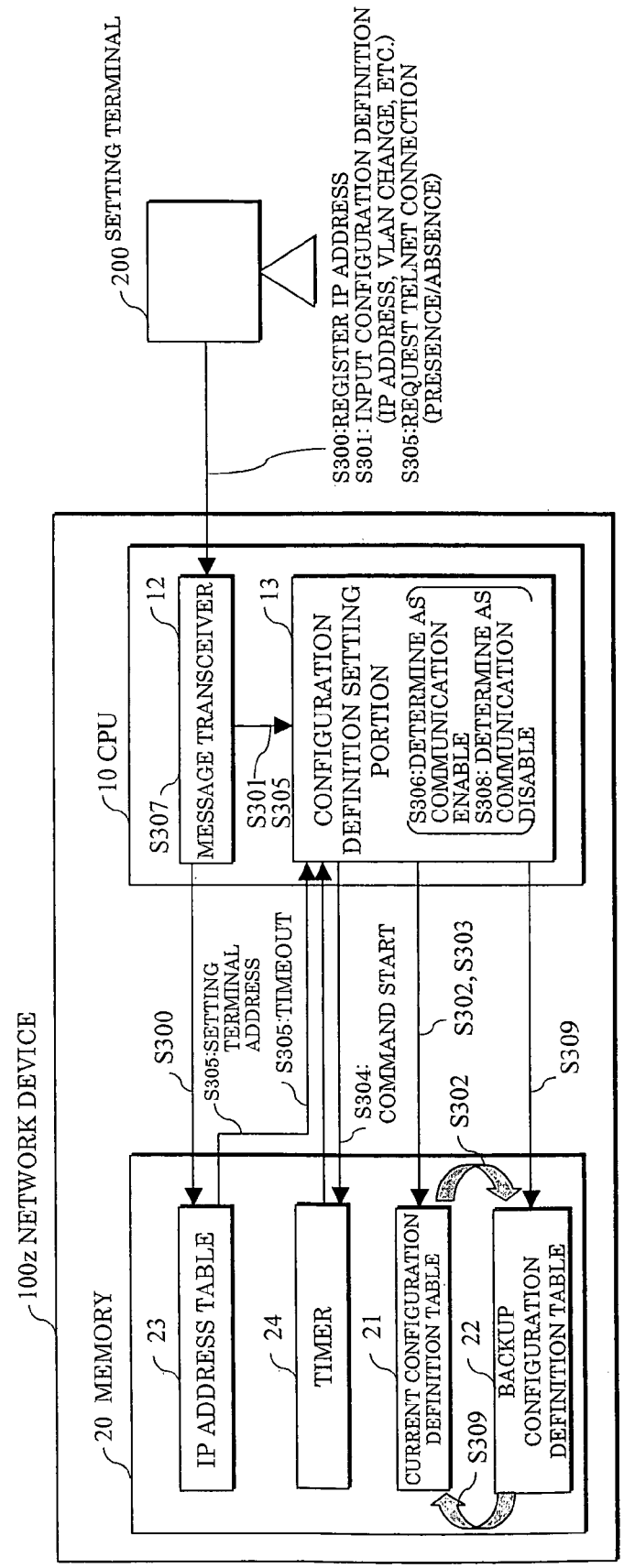
FIG. 9 is a block diagram showing an embodiment (3) of a network device according to the present invention.

FIG. 9 shows an embodiment (3) of a network device 100z according to the present invention. The arrangement of the network device 100z is different from that of the network device 100y of the embodiment (2) in that a timer 24 is added to the memory 20.

In the embodiment (3), when the change of the configuration definition (e.g. IP address of a physical interface or IP address of the management VLAN, or VLAN setting of the port which belongs to the management VLAN) is requested, the configuration definition to which the change is requested is performed. Then, when there is no access to the network device 100z from the setting terminal 200 (or setting supposition terminal) before a predetermined time elapses, it is determined that there is no connectivity at the IP level between the terminal and the network device 100z.

Figure 10:
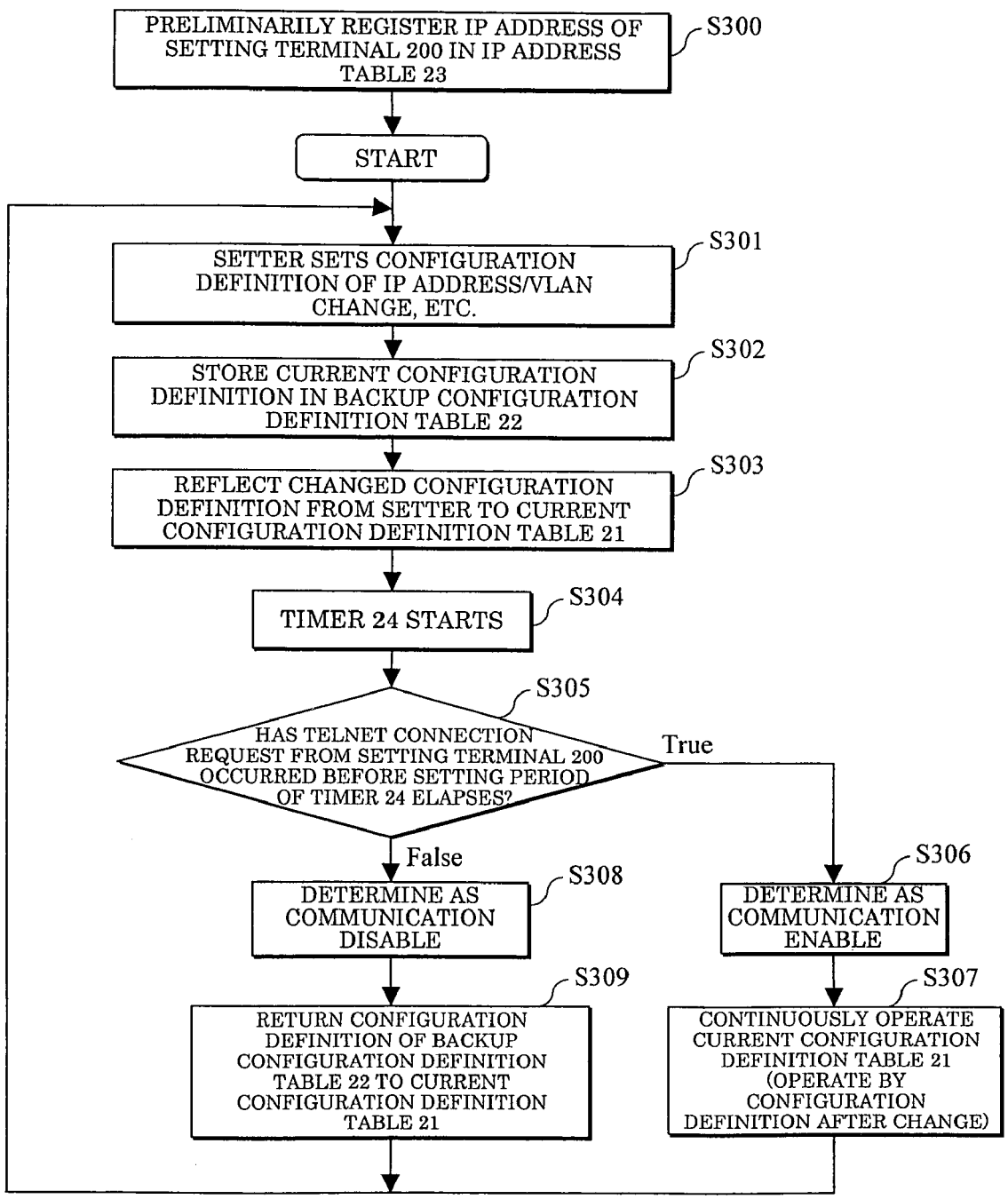
FIG. 10 is a flowchart showing an operation procedure of an embodiment (3) of a network device according to the present invention.

FIG. 10 shows an operation procedure example of the network device 100z. This operation procedure example will now be described referring to FIG. 9.

Step S300: The IP address of the setting terminal 200 is preliminarily registered in the IP address table 23.

Step S301: A setter transmits a change request of the configuration definition of the IP address of the physical interface or the IP address of the management VLAN or the like to the configuration definition setting portion 13 through e.g. the setting terminal 200 and the message transceiver 12.

Step S302: The configuration definition setting portion 13 saves the current configuration definition developed in the current configuration definition table 21 to the backup configuration definition table 22.

Step S303: The configuration definition setting portion 13 develops the change contents of the configuration definition received at step S301 in the current configuration definition table 21 to change the current configuration definition.

Step S304: Furthermore, the configuration definition setting portion 13 starts the operation of the timer 24.

Then the setting terminal 200 performs e.g. a Telnet connection request to the network device 100z within the setting period of the timer 24.

Steps S305-S307: When the configuration definition setting portion 13 receives the Telnet connection request with the IP address registered in the IP address table 23 before the setting period of the timer 24 elapses as the source address, it is determined that there is a connectivity (communication enable) with the terminal 200, and the operation of "configuration definition after change" of the current configuration definition table 21 is continued.

Steps S305, S308, and S309: When the configuration definition setting portion 13 receives no Telnet connection request before the setting period of the timer 24 elapses, it is determined as "communication disable" (without connectivity), and returns the "current configuration definition" of the backup configuration definition table 22 to the current configuration definition table 23 to restore the connectivity.

Thus, it becomes possible to determine the error setting, and to restore and hold the connectivity between the setting terminal 200 (or setting supposition terminal) and the network device 100z.

It is to be noted that the embodiment (3) can be applied to the case where the L3 device (network device) is arranged between the terminal 200 and the network device 100z.

It is to be noted that the network device may be provided with the functions of the embodiments (1)-(3), and these functions may be selected by mode switching to be used.

What we claim is:

1. A network device comprising:
    a storage storing, upon changing a first IP address to a second IP address, the second IP address as a virtual address;
    a message transceiver transmitting to a network a response request message whose source IP address is the second IP address, and receiving a response message for the response request message; and
    a configuration definition setting portion changing the first IP address to the second IP address when the message transceiver receives the response message.

2. The network device as claimed in claim 1, further comprising an IP address table storing a destination IP address of the response request message, the response request message being transmitted only to the destination IP address registered in the table.

3. The network device as claimed in claim 1, wherein the first and second IP addresses belong to a management VLAN.

4. The network device as claimed in claim 1, wherein a remote setting operation device designates the destination IP address of the response request message.

5. The network device as claimed in claim 1, wherein the response request message and the response message comprise ICMP messages.

6. The network device as claimed in claim 1, wherein a remote setting operation device designates the second IP address.

7. The network device as claimed in claim 1 comprising an L2 network device or an L3 network device.

8. The network device as claimed in claim 1, further comprising a timer started up upon transmitting the response request message, the configuration definition setting portion not changing the first IP address to the second IP address when no connection request is received from a remote setting operation device before a time set in the timer elapses.

9. A network device comprising:
    a backup configuration definition table temporarily storing a first configuration definition when a change from the first configuration definition to a second configuration definition includes a change of a VLAN definition of a port belonging to a management VLAN;
    a message transceiver transmitting to a network a response request message through a port of which VLAN definition has been changed, and receiving a response message for the response request message; and
    a configuration definition setting portion changing the first configuration definition to the second configuration definition, and then returning, when the message transceiver receives no response message, the second configuration definition to the first configuration definition temporarily stored in the backup configuration definition table.

10. The network device as claimed in claim 9, further comprising an IP address table storing a destination IP address of the response request message.

11. The network device as claimed in claim 9, wherein a remote setting operation device designates the destination IP address of the response request message.

12. The network device as claimed in claim 9, wherein the response request message and the response message comprise ICMP messages.

13. The network device as claimed in claim 9, wherein a remote setting operation device designates the second configuration definition.

14. The network device as claimed in claim 9, wherein the first and the second configuration definitions include an IP address.

15. The network device as claimed in claim 9 comprising an L2 network device or an L3 network device.

16. The network device as claimed in claim 9, further comprising a timer started up by a transmission of the response request message, the configuration definition setting portion returning the first configuration definition temporarily stored in the backup configuration definition table to a current configuration definition table when no connection request is received from a remote setting operation device before a time preset in the timer elapses.

* * * * *